United States Patent [19]

Akimoto

[11] 4,339,517
[45] Jul. 13, 1982

[54] COLOR CORRECTION METHOD FOR COLOR NEGATIVE

[75] Inventor: Taizo Akimoto, Minami-ashigara, Japan

[73] Assignee: Fuji Photo Film Co., Ltd., Minami-ashigara, Japan

[21] Appl. No.: 196,082

[22] PCT Filed: Aug. 15, 1979

[86] PCT No.: PCT/JP79/00214
§ 371 Date: Apr. 15, 1980
§ 102(e) Date: Apr. 15, 1980

[87] PCT Pub. No.: WO80/00500
PCT Pub. Date: Mar. 20, 1980

[30] Foreign Application Priority Data

Aug. 16, 1978 [JP] Japan .................. 53/99912

[51] Int. Cl.³ .............................................. G03C 5/04
[52] U.S. Cl. .................................... 430/30; 430/359; 355/38; 355/77
[58] Field of Search .................... 430/30, 359; 355/32, 355/38, 77

[56] References Cited

U.S. PATENT DOCUMENTS

| | | | |
|---|---|---|---|
| 3,152,897 | 10/1964 | Huboi et al. ............. | 430/30 |
| 3,709,613 | 1/1973 | Zahn et al. ............... | 355/68 |
| 3,873,201 | 3/1975 | Amano ..................... | 355/77 |
| 3,888,580 | 6/1975 | Amano et al. ........... | 355/38 |
| 4,079,388 | 3/1978 | Takahama et al. ...... | 355/35 |
| 4,100,424 | 7/1978 | Akimoto et al. ........ | 250/559 |
| 4,154,523 | 5/1979 | Rising et al. ............ | 355/38 |
| 4,168,120 | 9/1979 | Freier et al. ............. | 355/38 |
| 4,211,558 | 7/1980 | Oguchi et al. .......... | 430/30 |

Primary Examiner—J. Travis Brown
Attorney, Agent, or Firm—Fleit & Jacobson

[57] ABSTRACT

Color correction is conducted in a color printing system for negatives having undesirable color balance. The negatives are classified into groups, namely a group consisting of under-exposed negatives, a group consisting of over-exposed negatives, a group consisting of negatives exposed under tungsten light, a group consisting of negatives exposed under fluorescent light, a group consisting of negatives susceptible to color failure, a group consisting of negatives having high color temperature, a group consisting of negatives having low color temperature and a group consisting of aged negatives. In the color printing system, color correction is conducted in accordance with the group to which the negative to be printed belongs. The classification is carried out by measuring various characteristics such as large area transmission density (LATD), red, green and blue large area transmission densities, hue of the maximum density point, and ratio of area of particular colors.

10 Claims, 13 Drawing Figures

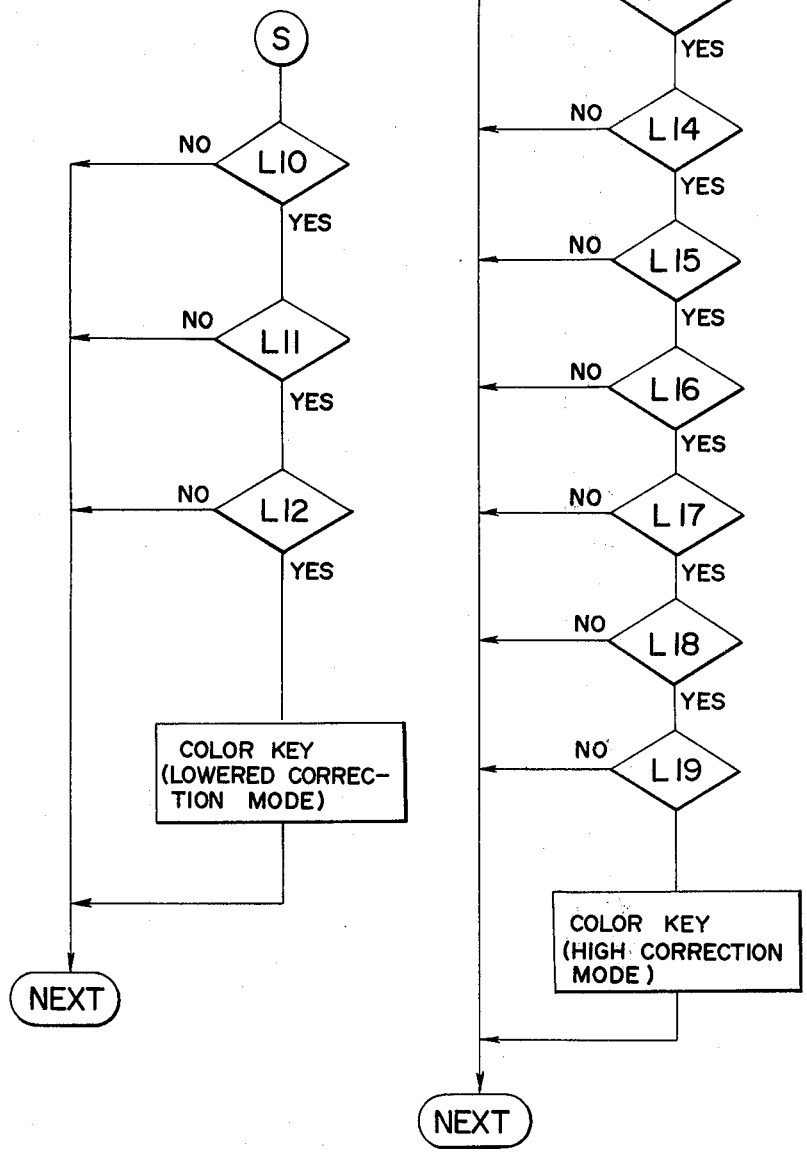

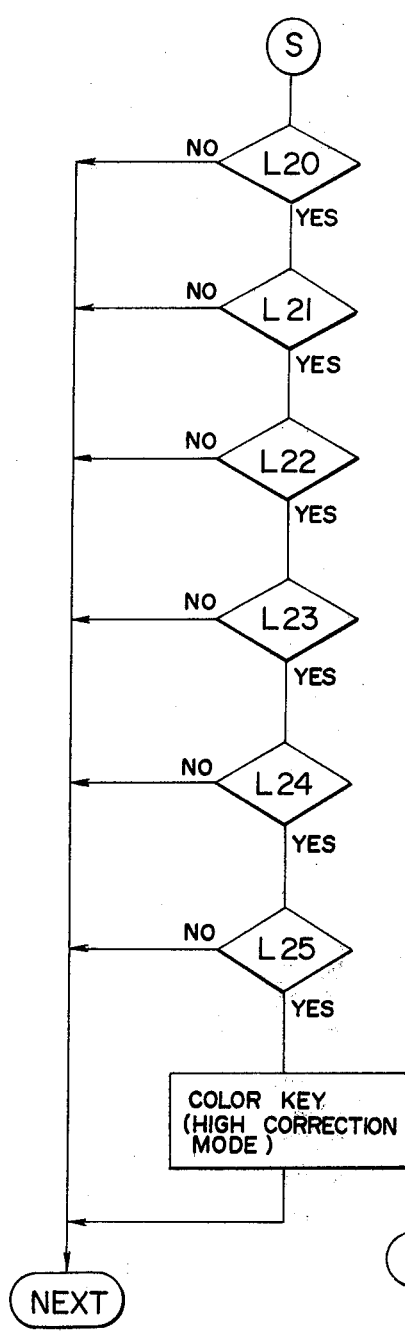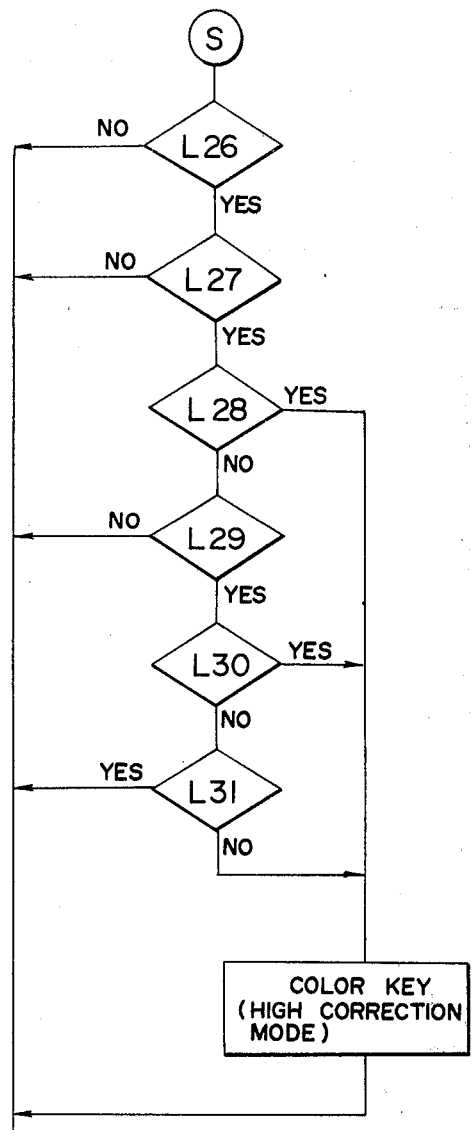

COLOR CORRECTION METHOD FOR COLOR NEGATIVE

TECHNICAL FIELD

This invention relates to a color correction method for a color printing system, and more particularly to a color correction method in which color negatives to be printed are classified in advance and color correction is conducted in accordance with the classification.

BACKGROUND ART

It has been determined by experiments that, in a large majority of color negatives, the blue, green and red spectral components of the light transmitted through the negative over the whole area thereof are substantially equal to one another, or in a constant ratio (the Evans Principle). Therefore, in most color printing systems, the printing light intensity is adjusted among the red, green and blue exposures on the basis of the red, green and blue large area transmission densities (LATD) of the original to be printed to thereby conduct color correction.

However, in the LATD printing system, the prints obtained are not always satisfactory. For instance, if the ratio of one of the three spectral components of the original to be printed is significantly greater than the ratio of the other two components, color correction based only on the LATD is unsatisfactory.

Such unsatisfactory printing is known as "color failure". When a color negative has been exposed under tungsten light illumination or fluorescent light illumination, the prints obtained are affected by the color of the light source. Moreover, when a color negative is under-exposed or over-exposed, the color balance of the prints obtained is poor because of the reciprocity law failure of the color paper, the shift of the peak of the spectral absorption of the color negative from the peak of the spectral sensitivity of the photo-receptor used in the printer, or the breakdown of the characteristic curve of the color sensitive layer at the high density region thereof.

In the conventional color printer based on the LATD system, the color prints determined to be unsatisfactory have been reprinted at another combination of the color keys selected on the basis of visual inspection by the operator. There also has been proposed a method of color correction in which color negatives are classified based on their blue, green and red large area transmission densities ($LATD_B$, $LATD_G$, $LATD_R$) and the color correction is conducted in accordance with the classification.

The problem is, however, that in the above described method of classification based only on the blue, green and red large area transmission densities, the color negatives cannot be classified into proper groups. For example, in plotting the $LATD_B$, $LATD_G$, $LATD_R$ of negatives susceptible to green color failure in a two-dimensional coordinate system wherein one of the axes represents the density difference between the red and green densities and the other represents the density difference between the green and blue densities, $LATD_R$, $LATD_G$ and $LATD_B$ will fall within a region 1 as shown in FIG. 1. Similarly, $LATD_B$, $LATD_G$ and $LATD_R$ of negatives exposed under fluorescent light illumination, aged negatives, negatives exposed under tungsten light illumination and negatives exposed under low color temperature natural light in the morning or evening fall respectively within the regions 2, 3, 4 and 5 shown in FIG. 1. As can be seen from FIG. 1, the regions 1, 2 and 3 are partly overlapped with each other as are the regions 3, 4 and 5. Accordingly, it is impossible to clearly distinguish the negatives of the above groups from each other based only on $LATD_R$, $LATD_G$ and $LATD_B$.

In order to obtain properly corrected color prints, all the negatives should be precisely classified into groups each consisting only of negatives which can be properly corrected through the same mode of correction. For example, negatives exposed under fluorescent light illumination can be properly corrected by high correction mode, while negatives susceptible to green color failure can be properly corrected by lowered mode correction in which exposures are controlled by a black shutter. Thus, unless these two types of negatives are classified into different groups, the prints obtained will be unsatisfactory.

The object of the present invention is to provide a color correction method for color negatives which can produce satisfactory color prints from the negatives, in which the negatives are classified into groups and color correction is carried out in accordance with the group in which the color negative is classified.

Studies conducted by the inventors show that when negatives photographed by amateurs are printed by the LATD system about 35.9% of the resulting color prints are of proper color balance, about 58.3% have undesirable color balance and about 5.0% are of bad quality due to focusing errors etc. at the time of exposure. About 3–5% of the negatives were found to have such poor color balance as to produce unsatisfactory color prints when printed by the LATD system.

The negatives having undesirable color balance can be classified into a group consisting of negatives exposed under fluorescent light illumination, a group consisting of negatives exposed under tungsten light illumination, a group consisting of negatives susceptible to color failure when printed by the LATD system, a group consisting of improperly exposed negatives, a group consisting of negatives having high color temperature (such as those exposed under cloudy conditions), a group consisting of negatives having low color temperature (such as those exposed under natural light in the morning or evening) and a group consisting of aged negatives. The groups having particularly poor color balance were those consisting of under-exposed negatives, over-exposed negatives, negatives susceptible to color failure when printed by the LATD system, and negatives exposed under fluorescent light or tungsten light illumination. These groups were generally found to account for a large portion of the negatives photographed by amateurs. Therefore, if such negatives can be properly color-corrected, the yield of satisfactory color prints can be substantially raised.

DISCLOSURE OF INVENTION

Various characteristics of a large number of color negatives were examined and it was found that under-exposed negatives, over-exposed negatives, negatives exposed under tungsten light illumination, negatives exposed under fluorescent light illumination, negatives susceptible to color failure, negatives having high color temperature, negatives having low color temperature and aged negatives can be distinguished from each other by measuring various characteristics such as the large area transmission density (LATD), hue based on LATD (the red, green and blue large area transmission densities $LATD_R$, $LATD_G$ and $LATD_B$), hue (the red, green and blue densities R, G and B) of the maximum density point, area ratios of particular colors, the average hue of the points having flesh color under fluorescent light illumination and the average hue of the points having flesh color under tungsten light illumination.

In accordance with the present invention, negatives to be printed are classified into groups of under-exposed negatives (hereinafter referred to as "under-exposed negative group"), over-exposed negatives ("over-exposed negative group"), negatives susceptible to color failure ("color failure group"), negatives exposed under tungsten light illumination ("tungsten light group"), negatives exposed under fluorescent light illumination ("fluorescent light group"), negatives having high color temperature ("high color temperature group"), negatives having low color temperature ("low color temperature group"), and aged negatives ("aged negative group"). Each negative is then color corrected in accordance with the group to which it belongs.

Among said particular colors are included blue, red, green, yellow, gray and flesh color.

BRIEF DESCRIPTION OF DRAWINGS

FIG. 5 is a flow chart for the color failure identifying subsection, FIG. 7 is a flow chart for the tungsten light identifying subsection, FIG. 8 is a flow chart for the fluorescent light identifying subsection, FIGS. 11 to 13 are flow charts for the aged negative identifying subsection, the high color temperature identifying subsection and the low color temperature identifying subsection, respectively.

BEST MODE OF CARRYING OUT THE INVENTION

Figure 2:
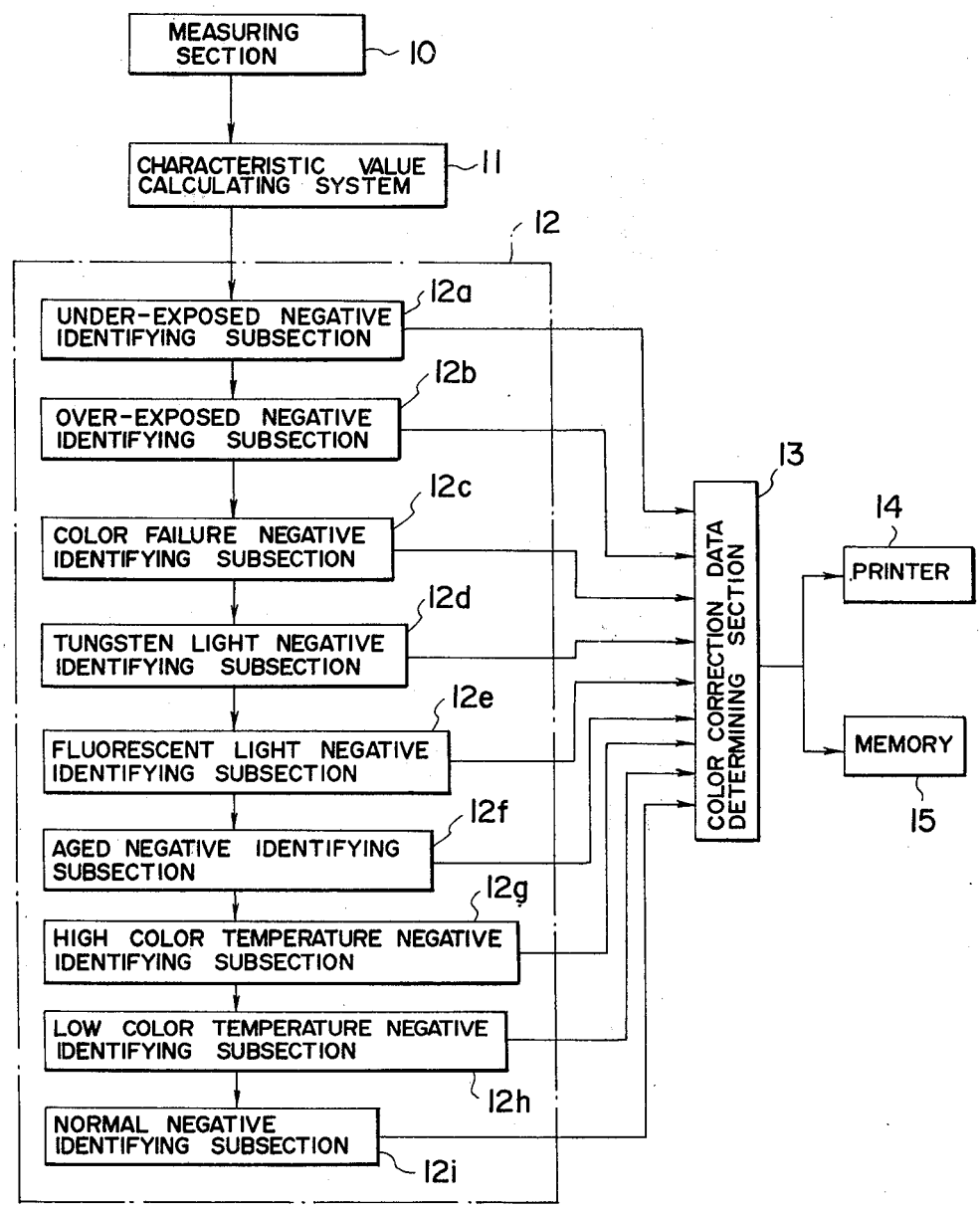
FIG. 2 is a block diagram illustrating an example of a color printing system for carrying out the method of this invention.

FIG. 2 is a block diagram illustrating an example of a color printing system for carrying out the method of this invention. Now referring to FIG. 2, a color negative is measured by its white light large area transmission density ($LATD_W$) as well as its red, green and blue large area transmission densities ($LATD_R$, $LATD_G$, $LATD_B$) at a measuring section 10. The negative is further measured by its red transmission density R, green transmission density G and blue transmission density B at a plurality of (e.g. 560) points. The measuring section 10 comprises a flying spot scanner which scans the surface of the negative in two-dimensions.

More particularly, the flying spot scanner includes a rotary disc having a plurality of holes spaced from each other at a predetermined phase. By rotating the rotary disc, the surface of the negative is scanned by a light spot passing through the holes of the rotary disc. The light spot has a diameter of less than 1 mm. The light passing through the negative at each point is separated into three colors, i.e., red, green and blue by means of dichroic mirrors. The light of each color is measured by its density in a separate photomultiplier. The outputs of the photomultiplier corresponding to the separated colors of light are log-converted and then sampled by a sample-and-hold circuit. Thus, the color negative is measured by its red, green and blue densities at, for example, 560 points.

The rotary disc has a rectangular opening through which the negative can be illuminated over the whole area thereof. Through the rectangular opening, the white light large area transmission density ($LATD_W$) and the red, green and blue large area transmission densities ($LATD_R$, $LATD_G$ and $LATD_B$) of the negative are measured. The values of $LATD_W$, $LATD_R$, $LATD_G$ and $LATD_B$ may be calculated as average values of the red, green and blue densities of said 560 points.

The red, green and blue densities of each point (R, G, B), and $LATD_W$, $LATD_R$, $LATD_G$ and $LATD_B$ are delivered to a characteristic value calculating section 11 and the characteristic values such as hue of the point having maximum density, area ratios of particular colors and hue thereof are calculated therein.

The calculated characteristic values are delivered to a negative identifying section 12, wherein the negatives are classified into groups. The negative identifying section 12 comprises an under-exposed negative identifying subsection 12a in which under-exposed negatives are distinguished from others, an over-exposed negative identifying subsection 12b in which over-exposed negatives are distinguished from others, a color failure identifying subsection 12c in which negatives susceptible to color failure when printed by the LATD system are identified from others, a tungsten light identifying subsection 12d in which negatives exposed under tungsten light illumination are distinguished from others, a fluorescent light identifying subsection 12e in which negatives exposed under fluorescent light illumination are distinguished from others, an aged negative identifying subsection 12f in which aged negatives are distinguished from others, a high color temperature identifying subsection 12g in which negatives having high color temperature are distinguished from others, a low color temperature identifying subsection 12h in which negatives having low color temperature are distinguished from others, and a normal negative identifying subsection 12i in which negatives having substantially proper color balance are distinguished from others. In the normal negative identifying subsection 12i, the negatives which are not classified into the other groups are determined to be normal negatives.

Thus, negatives are classified into 9 groups at the negative identifying section 12. The information representing the group to which the negative to be printed belongs is delivered to a color correction data determining section 13. The color correction data determining section 13 outputs a signal which indicates a degree of color correction depending upon the information delivered from the negative identifying section 12. The relation between the degree of color correction and the classification of the negative is predetermined.

An example of this relation is shown in Table 1.

TABLE 1

| negative | correction | |
|---|---|---|
| | correction mode | color key |
| under-exposed | H | 0 1 A |
| over-exposed | L OR NONE | 0 A 0 |
| color failure | L | R C 0 0 |
| | | G 0 B 0 |
| | | B 0 0 B |
| tungsten light | H | 2 0 B |
| fluorescent light | H | 0 3 A |
| aged | H | 0 2 A |
| high color temperature | H | 0 A 0 |
| low color temperature | H | 1 0 A |
| normal | — | — |

In Table 1 "H" and "L" represent "high correction mode" and "low correction mode". Read from right to left, the color key symbols represent the exposure time to cyan, magenta and yellow light. For example, 0 1 A indicates that the exposure time to magenta light as determined based on LATD is to be increased by a predetermined rate, and the exposure time to yellow light determined based on LATD is to be decreased by a predetermined rate.

As shown in the Table 1, when the negative to be printed is determined to be under-exposed, for example, the color correction data determining section 13 outputs a signal which represents high correction mode and "0 1 A" color key.

In an on-line type color printer, the exposure time of the printer 14 is controlled by the signal from the color correction data determining section 13.

In an off-line type color printer, the signal from the color correction data determining section 13 is stored in a memory 15 comprising, for example, a magnetic recording tape or perforated paper tape and the printer is controlled by a signal from the memory 15.

Some negatives may be classifiable into two of the groups. In such a case, the negative is preferentially classified into one of the two groups. For example, when a negative can be classified into either the fluorescent light group or the aged negative group, the negative is preferentially classified into the former group. When a negative can be classified into either the aged negative group or the low color temperature group, the negative is preferentially classified into the former group. When a negative can be classified into either the tungsten light group or the low color temperature group, the negative is preferentially classified into the former group.

In correcting by means of correction modes, it is preferable to divide each correction mode into a plurality of steps and to use a suitable step depending on the degree of the color defect of the negative to be printed.

Hereinafter, condition formulae used to classify negatives are described referring to FIGS. 2 to 13.

(I) Under-exposed negatives

Under-exposed negatives having improper color balance are preferably corrected in accordance with the image thereon rather than by the slope control method in which the slope of the characteristic curve is changed. However, it is difficult to classify under-exposed negatives on the basis of their images because of the non-linearity of the photosensitive material and the precision of the photoreceptor.

A large number of under-exposed negatives were visually inspected and it was found that almost all of them had been taken indoors under tungsten light, fluorescent light or electronic flash light. Further, it was experimentally confirmed that such under-exposed negatives can produce color prints of proper color balance when printed by high correction mode, (See Japanese Patent Public Disclosure 12082/1972.).

Such under-exposed negatives are printed by high correction mode unless printing by high correction mode would produce unsatisfactory prints. The under-exposed negatives which would produce unsatisfactory prints when printed by high correction mode should therefore be excluded, as will be described hereinafter.

Under-exposed negatives have a low value of $LATD_W$, which indicates the lightness of the entire area of the image formed on the negative. Accordingly, under-exposed negatives will satisfy the following formula:

$$LATD_W \leq u_1 \tag{1}$$

wherein $u_1$ is a standard value to be experimentally determined.

Almost all of the under-exposed negatives had been taken under tungsten light, fluorescent light or electronic light, and the under-exposed negatives can be printed preferably by the high correction mode. Therefore, in the under-exposed negatives, only $LATD_B$, $LATD_G$ and $LATD_R$ are examined.

A color can be defined by an angle $\theta$ and a distance $\rho$ from the origin in the two-dimensional coordinate system wherein the ordinate represents (G−B) and the abscissas (R−G). When hue based on LATD ($LATD_B$, $LATD_G$ and $LATD_R$) of negatives photographed in fluorescent light, tungsten light or electronic flash light is represented by $L\theta$ and $L\rho$, $L\theta$ and $L\rho$ will satisfy the following formula:

$$L\rho \geq L\rho_1 \cap L\theta_1 \leq L\theta \leq L\theta_2 \tag{2}$$

wherein $L\rho_1$, $L\theta_1$ and $L\theta_2$ are standard values to be experimentally determined.

The negatives which would produce unsatisfactory prints when printed by high correction mode include those susceptible to color failure, those in which green the portion accounts for a large area and those the hue of which is neutral gray. Negatives susceptible to color failure can be identified by measuring the area ratios of the red, green, blue and yellow portions thereof. The negatives having neutral gray hue can be distinguished by measuring the area ratio of the gray portion thereof.

The particular colors, i.e., red, green, blue, yellow and gray, can be defined by particular regions in the chromaticity coordinate system, which may be a three-dimensional system or a two-dimentional system with the axes representing the red, green and blue densities or combinations of the color densities. When the red, green and blue densities of a measured point fall within a particular region, the point may be determined to be of the particular color which corresponds to the region.

The area ratio of the particular color can be defined as n/N, N and n being the total number of the measured points and the number of points of the particular color, respectively. Actually, since the total number N of the measured points is fixed, e.g., 560, the number n of the particular color points may be used instead of the area ratio n/N.

The negatives which would result in unsatisfactory points can be excluded by the following formulae:

$$nR \leq A_1 \quad (3)$$

$$nG \leq A_2 \quad (4)$$

$$nB \leq A_3 \quad (5)$$

$$nY \leq A_4 \quad (6)$$

$$nGray \leq A_5 \quad (7)$$

wherein nR, nG, nB, nY and nGray represent the number of red, green, blue, yellow and gray points, respectively, and $A_1$ to $A_5$ are standard values to be experimentally determined.

The above standard values, i.e., $u_1$, $L\rho_1$, $L\rho_2$, $L\rho_3$, $A_1$, $A_2$, $A_3$, $A_4$ and $A_5$ were experimentally determined by inspecting a large number of under-exposed negatives photographed over the whole year. The determined standard values were substituted into the formulae (1) to (7) to give the following formulae. The total number of measured points was 560.

$$LATD_W \leq 0.3 \quad (1')$$

$$L\rho \geq 0.1 \cap 300° \leq L\theta < 130° \quad (2')$$

$$nR \leq 20 \quad (3')$$

$$nG \leq 100 \quad (4')$$

$$nB \leq 10 \quad (5')$$

$$nY \leq 100 \quad (6')$$

$$nGray \leq 200 \quad (7')$$

Color negatives which satisfy the above formulae (1')–(7') are printed by high correction mode or using a combination of color keys of (0 1 A).

Figure 3:
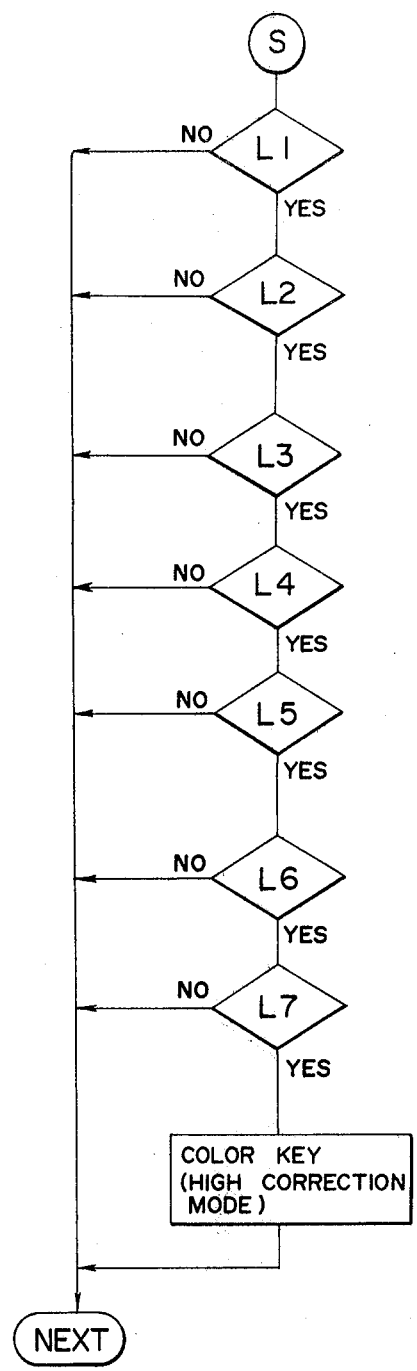
FIG. 3 is a flow chart for the under-exposed negative identifying subsection.

FIG. 3 shows a flow chart for identifying under-exposed negatives in the under-exposed negative identifying section 12a. As shown in FIG. 3, it is first determined whether the $LATD_W$ of the negative satisfies the relation $LATD_W \leq 0.3 \ldots (1')$ (decision $L_1$). If the answer is "YES", the negative is subsequently examined as to whether its hue based on LATD satisfies the relation $L\rho \geq 0.1 \cap 300° \leq L\theta < 130° \ldots (2')$ (decision $L_2$). If the answere is "YES", the negative is then examined as to whether $nR \leq 20 \ldots (3')$. Similarly the characteristic values of the negative are sequentially examined to determine whether they satisfy the formulae (4')–(7') (decision $L_4$ to $L_7$, respectively). If in any case the answer is "NO", the sequence is interrupted, and the negative is determined not to belong to the under-exposed group and the negative is delivered to the next subsection, i.e., the over-exposed negative identifying subsection 12b in FIG. 2. If the answers in the decisions $L_1$ to $L_7$ are all "YES", i.e., if the answer in the last decision $L_7$ is "YES", the negative is determined to belong to the under-exposed group.

(II) Over-exposed negatives

Over-exposed negatives are difficult to classify on the basis of their images for reasons similar to those explained in connection with under-exposed negatives.

Various studies with respect to over-exposed negatives has revealed that they should be color-corrected primarily because there otherwise occurs a change in the linearity of the characteristic curve (primarily a breakdown of the curve) of at least one over-exposed photosensitive material, and that such over-exposed negatives can produce satisfactory prints when printed by using a certain predetermined combination of color keys. For example, when the breakdown occurs in the high density portion of the green-sensitive layer, a color key for reducing the exposure time of the magenta light is selected. Further such over-exposed negatives can produce satisfactory prints when printed at lowered correction mode in which a black shutter is used.

In over-exposed negatives, $LATD_W$ should inherently be large enough to satisfy the following formula:

$$LATD_W \geq u_1 \quad (8)$$

In the above formula, $u_1$ represents an experimentally determined standard value. However, negatives having relatively low saturation ($L\rho$) require color correction even if their $LATD_W(u_3)$ is slightly smaller than $u_1$. Such negatives will satisfy the formula:

$$LATD_W \geq u_3 \cap L\rho \leq L\rho_2 \quad (9)$$

wherein $u_3$ and $L\rho_2$ are experimentally determined standard values and $u_3$ has value slightly smaller than $u_1$.

The standard values were experimentally determined from a large number of negatives. Thus, the following formulae were obtained using the standard values.

$$LATD_W \geq 1.5 \quad (8')$$

$$LATD_W \geq 1.2 \cap L\rho \leq 0.2 \quad (9')$$

In negative identifying subsection 12, negatives satisfying formula (8') or (9') are determined to belong to the over-exposed group. Negatives determined to belong to the over-exposed group are printed by using a combination of color keys such as (0 A 0).

Figure 4:
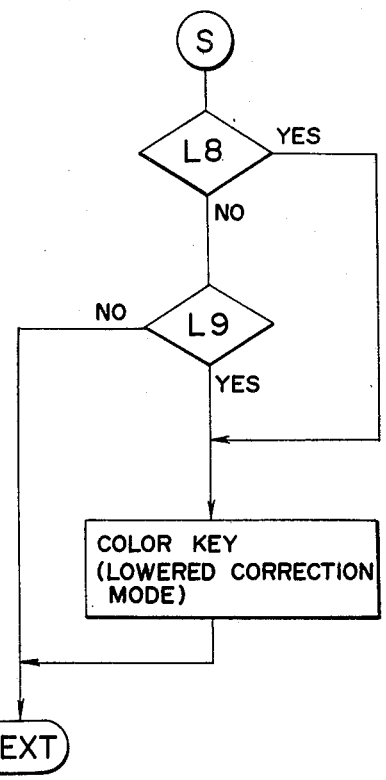
FIG. 4 is a flow chart for the over-exposed negative identifying subsection.

FIG. 4 shows a flow chart for identifying over-exposed negatives in over-exposed negative identifying subsection 12b. As shown in FIG. 4, a negative is first examined as to whether it satisfies formula (8') (decision $L_8$).

If the answer is "NO", the negative is examined as to whether it satisfies formula (9') (decision $L_9$).

If the answer in decision $L_9$ is "NO", the negative is delivered to the next subsection, i.e., the subsection 12c in FIG. 2. If the answer in either decision $L_8$ or $L_9$ is "YES", the negative is determined to belong to the over-exposed group.

(III) Negatives susceptible to color failure

Color failure is apt to occur when a particular color has high saturation and occupies a relatively large area. About 25,000 negatives were examined for color failure and it was found that red, green, blue and yellow are especially apt to cause color failure and that magenta may sometimes cause color failure.

Among the various kinds of reds, the red of flowers and artificial red, e.g., the red of clothes or of Japanese shrines, are very apt to cause color failure.

The green of leaves and the green of grass are also very apt to cause color failure.

Further, the blue of the sky, the sea or clothes and the yellow of clothes very frequently cause color failure. Sometimes magenta causes color failure.

Accordingly, if color failure can be prevented with respect to the above colors, almost no color failure will occur.

The negatives determined to be susceptible to color failure are printed by lowered correction mode or by using a predetermined combination of color keys.

Under-expoed negatives are not classified into the color failure group regardless of whether they are susceptible to color failure, since it is difficult to detect their hue and accordingly a misclassification will occur.

Thus negatives which are to be classified into the color failure group should satisfy at least the following formula:

$$LATD_W \geq u_1 \tag{10}$$

In case of negatives susceptible to color failure, the ratio of $LATD_R$, $LATD_G$ and $LATD_B$ is inclined depending on the color of the color failure.

Thus, in case of a negative susceptible to red failure, the negative will satisfy the following formula:

$$L\rho \geq L\rho_3 \cap L\theta_3 \leq L\theta \leq L\theta_4 \tag{11}$$

wherein $L\rho_3$, $L\theta_3$ and $L\theta_4$ are standard values to be experimentally determined.

Further, in case of a negative susceptible to red failure, the area ratio of the red portion will be substantially larger than that of the blue portion. (In this embodiment, a substantial part of the cyan region is included in the red region. Therefore, blue can be used as the complementary color.) Thus, the following formula will be satisfied:

$$nRB = n_1R - n_2B \geq A_6 \tag{12}$$

wherein $A_6$ is a standard value to be experimentally determined, and $n_1R$ and $n_2B$ represent the number of red points and blue points, respectively. Although, the accuracy may be somewhat lowered, it is possible to use the area ratio of the red portion independently instead of using the difference between it and the area ratio of the complementary color.

The above standard values were experimentally determined by inspecting 25,000 negatives photographed over the full year to obtain the following formulae:

$$LATD_W \geq 0.3 \tag{10'}$$

$$L\rho \geq 0.2 \cap 330° \leq L\theta \leq 90° \tag{11'}$$

$$nRB \geq 30 \tag{12'}$$

It is preferable to select a combination of color keys in accordance with the value of nRB which represents the area of the red portion. Table 2 shows an example of the relation between the value of nRB and the combination of color keys to be selected.

TABLE 2

| n R B | color key C M Y |
|---|---|
| 30–100 | A 0 0 |
| 101–150 | B 0 0 |

TABLE 2-continued

| n R B | color key C M Y |
|---|---|
| 151–250 | C 0 0 |
| 251– | D 0 0 |

Similarly, in case of green failure, the following formulae will be satisfied:

$$LATD_W \geq 0.3 \tag{13}$$

$$L\rho \geq 0.2 \cap 100° \leq L\theta \leq 150° \tag{14}$$

$$nG \geq 100 \tag{15}$$

In case of blue failure, the following formulae will be satisfied:

$$LATD_W \geq 0.3 \tag{16}$$

$$L\rho \geq 0.2 \cap 200° \leq L\theta \leq 250° \tag{17}$$

$$nBY = nB - nY = 150 \tag{18}$$

In case of yellow failure, the following formulae will be satisfied:

$$LATD_W \geq 0.3 \tag{19}$$

$$L\rho \geq 0.2 \cap 65° \leq L\theta \leq 85° \tag{20}$$

$$nYB = nY - nB = 150 \tag{21}$$

When a negative satisfies all of the formulae (10')–(12'), all of the formulae (13)–(15), all of the formulae (16)–(18) or all of the formulae (19)–(21), the negative is determined to belong the color failure group. However, if one or more of the above color failures is considered not to be significant, then the formulae corresponding to the color failure(s) may be omitted.

The color negatives classified into the color failure group are printed at lowered correction mode or by use of a predetermined suitable combination of color keys.

FIG. 5 shows a flow chart for identifying a negative susceptible to red failure in the color failure identifying subsection 12c. As shown in FIG. 5, a negative is sequentially examined as to whether it satisfies the above formulae (10') to (12') (decisions $L_{10}$ to $L_{12}$).

If the answer in the decisions $L_{11}$ and $L_{12}$ are both "YES", the negative is determined to belong the color failure group. When the answer in at least one of the decisions $L_{10}$ and $L_{12}$ is "NO", then the negative is examined as to whether it is susceptible to green, blue or yellow failure. If it is determined that the negative is susceptible to one of the failures, the negative is classified into the color failure group. If it is determined that the negative is not susceptible to any color failure, the negative is delivered to the next subsection, i.e., the tungsten light identifying subsection 12d of the negative identifying section 12.

(IV) Negatives photographed in tungsten light

For the reasons described above, under-exposed negatives are not classified into the tungsten light group, even if photographed in tungsten light. Thus, $LATD_W$ should be:

$$LATD_W \geq u_1 \tag{22}$$

Hue based on LATD of negatives photographed in tungsten light is generally distributed over a certain limited range.

Therefore, $L\rho$, $L\theta$, i.e., hue based on LATD of a negative will satisfy the following formula when the negative has been photographed in tungsten light:

$$L\rho \geq L\rho_4 \cap L\theta_5 \leq L\theta \leq L\theta_6 \qquad (23)$$

wherein $L\rho_4$, $L\theta_5$ and $L\theta_6$ are standard values to be experimentally determined.

Further, in a large majority of negatives photographed in tungsten light, the maximum density point has the color of the tungsten light. Accordingly, a negative photographed in tungsten light generally satisfies the following formula:

$$DM\theta_1 \leq DM\theta \leq DM\theta_2 \qquad (24)$$

wherein $DM\theta$ represents the hue of the maximum density point of the negative and $DM\theta_1$ and $DM\theta_2$ are standard values to be experimentally determined.

Figure 1:
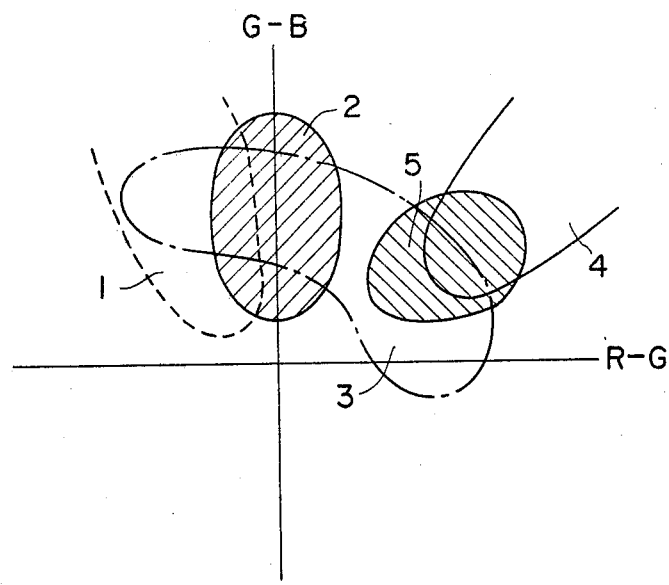
FIG. 1 is a two-dimensional coordinate system showing the color distributions of negatives exposed under tungsten light illumination, negatives exposed under fluorescent light illumination, negatives susceptible to green failure, aged negatives and negatives having low color temperature.
Figure 6:
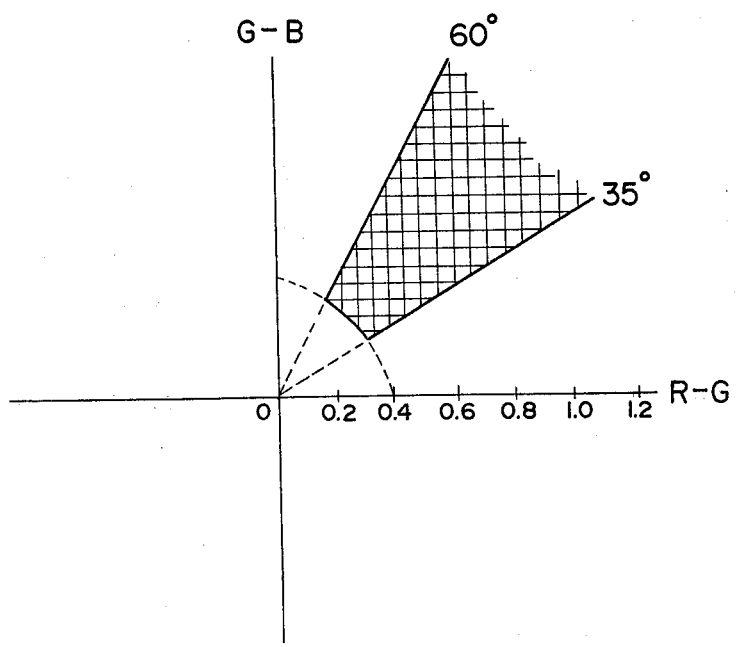
FIG. 6 is a two-dimensional chromaticity coordinate system showing the region defining flesh color under tungsten light illumination.

In more than about 80% of all the color negatives, the principal subject matter is a human figure. Flesh color of the human figure changes in its hue depending on the color of the light source in which the negative was photographed. Flesh color photographed in tungsten light can be defined by an ellipse or an ellipsoid in the two- or three-dimensional chromaticity coordinate system, or can be defined by a trapezoid as shown in FIG. 6. When the measured red, green and blue densities of a point fall within the ellipse, the ellipsoid or the trapezoid, the point is determined to have flesh color photographed in tungsten light.

A negative photographed in tungsten light should inherently have many measured points which are determined to have flesh color under tungsten light. Thus, it is possible to detect whether a negative has been photographed in tungsten light by counting the number of the measured points which are determined to have flesh color under tungsten light. Further, in a negative photographed in tungsten light, average hue of the points determined to have flesh color under tungsten light should exist within limited range. Thus, a negative photographed in tungsten light generally satisfies the following formula:

$$nST \geq A_7 \cap FTX \geq FTX_1 \qquad (25)$$

wherein FTX represents said average hue, X representing R-G, nST represents the number of the measured points determined to have flesh color under tungsten light and $FTX_1$ is a standard value to be experimentally determined.

Further, in a negative photographed in tungsten light, the number of gray points (nGray) is significantly low, since the gray portion of the subject matter of the negative has been shifted toward a different hue under the influence of the color of the tungsten light. Accordingly, $$nGray \leq A_8 \qquad (26)$$

wherein $A_8$ is a standard value to be experimentally determined.

A negative having a yellow subject matter is apt to be mistaken as a negative photographed in tungsten light in the detection based on LATD. Accordingly, a negative having more than a predetermined number of yellow points should be excluded. Thus, $$nY \leq A_9 \qquad (27)$$

wherein $A_9$ is a standard value to be determined experimentally.

Also, in a negative photographed in tungsten light, the number of points determined to have flesh color under daylight should be significantly reduced. Accordingly, the accuracy of the discrimination will be increased by counting the number of the points having flesh color under daylight. The number of points determined to have flesh color under daylight will not necessarily become zero, since some colors similar to flesh color may sometimes be mistaken as flesh color. Thus, $$nSF \leq A_{10} \qquad (28)$$

wherein nSF represents the number of points determined to have flesh color under daylight.

The above formulae (22)–(28) are grouped together as follows.

$$LATD_W \geq u_1 \qquad (22)$$

$$L\rho \geq L\rho_4 \cap L\theta_5 \leq L\theta \leq L\theta_6 \qquad (23)$$

$$DM\theta_1 \leq DM\theta \leq DM\theta_2 \qquad (24)$$

$$nST \geq A_7 \cap FTX \geq FTX_1 \qquad (25)$$

$$nGray \leq A_8 \qquad (26)$$

$$nY \leq A_9 \qquad (27)$$

$$nSF \leq A_{10} \qquad (28)$$

Thus, a negative to be classified into the tungsten light group should satisfy all the formulae (22) to (28).

The above standard values were experimentally determined by inspecting 25,000 negatives photographed over the whole year to obtain the following formulae:

$$LATD_W \geq 0.3 \qquad (22')$$

$$L\rho \geq 0.2 \cap 40° \leq L\theta < 100° \qquad (23')$$

$$4° \leq DM\theta \leq 100° \qquad (24')$$

$$nST \geq 10 \cap FTX \geq 0.30 \qquad (25')$$

$$nGray \leq 100 \qquad (26')$$

$$nY \leq 100 \qquad (27')$$

$$nSF \leq 100 \qquad (28')$$

FIG. 7 shows a flow chart for identifying a negative photographed in tungsten light in the tungsten light identifying subsection 12d. As shown in FIG. 7, a negative is sequentially examined as to whether it satisfies the above formulae (22') to (28') (decisions $L_{13}$ to $L_{19}$). If the answer in the last decision, i.e., the decision $L_{19}$ is "YES", i.e., if the answers in the decisions $L_{13}$ to $L_{19}$ are all "YES", the negative is determined to have been photographed in tungsten light and the color correction is conducted at high correction mode. If any answer is "NO", the negative is determined not to belong to the tungsten light group and the sequence is interrupted. The negative is then delivered to the next subsection of the negative identifying section 12, i.e., to the fluorescent light identifying subsection 12e.

33 negatives thus determined to have been photographed in tungsten light out of 16,400 negatives were printed by high correction mode. The result of the experiment is tabulated in Table 3.

TABLE 3

| total number of negatives | number of negatives of the tungsten light group | good | no good |
|---|---|---|---|
| 16,400 | 33 | 28 | 5 |

As shown in Table 3, 28 negatives out of 33 negatives which were determined to have been photographed in tungsten light produced satisfactory prints having proper color balance and 5 produced unsatisfactory prints. It can be considered that in the conventional LATD printing system, the 33 negatives would all produce unsatisfactory prints, since no color correction is conducted for negatives photographed in tungsten light.

(V) Negative photographed in fluorescent light

For the reasons described above, under-exposed negatives are not classified into the fluorescent light group, even if photographed in fluorescent light. Thus, $$LATD_W \geq u_1 \tag{29}$$

Hue based on LATD ($LATD_R$, $LATD_G$, $LATD_B$) of negatives photographed in fluorescent light is generally distributed over a certain limited range. Therefore, $L\rho$, $L\theta$, i.e., hue based on LATD of a negative, will satisfy the following formulae when the negative has been photographed in fluorescent light:

$$L\rho \geq L\rho_5 \cap L\theta_7 < L\theta < L\theta_8 \tag{30}$$

wherein $L\rho_5$, $L\theta_7$ and $L\theta_8$ are standard values to be experimentally determined.

Further, in a large majority of negatives photographed in fluorescent light, the maximum density point has the color of the fluorescent light. Accordingly, the following formula will be satisfied.

$$DM\rho \geq DM\rho_2 \cap DM\theta_3 < DM\theta < DM\theta_4 \tag{31}$$

wherein $DM\rho$ and $DM\theta$ represent the hue of the maximum density point of the negative, and $DM\rho_2$, $DM\theta_3$ and $DM\theta_4$ are standard values to be experimentally determined.

When representing the hue of flesh color under fluorescent light by $FL_X$, $FL_y$ ($X=R-G$, $Y=G-B$), a negative photographed in fluorescent light will satisfy the following formula:

$$FL_X \leq FL_{X1} \cap FL_Y \geq FL_{Y1} \tag{32}$$

wherein $FL_{X1}$ and $FL_{Y1}$ are standard values to be experimentally determined.

In a negative photographed in fluorescent light, the number of points determined to have flesh color under daylight is likely to be significantly low. Accordingly, the accuracy of the discrimination can be increased by counting the number of points having flesh color under daylight. Thus, $$nSF \geq A_{11} \tag{33}$$

wherein $A_{11}$ is a standard value to be determined experimentally.

Further, in a negative photographed in fluorescent light, the number of points having a particular color such as gray is significantly low because of the influence of the color of the fluorescent light. Thus, $$nGray \geq A_{12} \tag{34}$$

wherein $A_{12}$ is a standard value experimentally determined.

A negative in which the background of the principal subject matter is yellow or yellow-green is apt to be mistaken for one photographed in fluorescent light. So, it is preferred to employ an area ratio of the yellow portion or yellow-green portion. A measured point is determined to have such a particular color, when the measured red, green and blue densities of the point fall within a region defining the particular color in the chromaticity coordinate system which has been experimentally determined.

The above formulae (29)–(34) are grouped together as follows.

$$LATD_W \geq u_1 \tag{29}$$

$$L\rho \geq L\rho_5 \cap L\theta_7 < L\theta < L\theta_8 \tag{30}$$

$$DM\rho \geq DM\rho_2 \cap DM\theta_3 < DM\theta < DM\theta_4 \tag{31}$$

$$FL_X \leq FL_{X1} \cap FL_Y \geq FL_{Y1} \tag{32}$$

$$nSF \geq A_{11} \tag{33}$$

$$nGray \geq A_{12} \tag{34}$$

A negative which satisfies all of the formulae (29) to (34) is determined to have been photographed in fluorescent light.

The above standard values were experimentally determined by inspecting 25,000 negatives photographed over the whole year to obtain the following formulae:

$$LATD_W \geq 0.3 \tag{29'}$$

$$L\rho \geq 0.25 \cap 70° < L\theta < 140° \tag{30'}$$

$$DM\rho \geq 0.35 \cap 100° < DM\theta < 135° \tag{31'}$$

$$FL_X \leq 0.05 \cap FL_Y \geq 0.30 \tag{32'}$$

$$nSF \geq 4 \tag{33'}$$

$$nGray \geq 4 \tag{34'}$$

Instead of the above formulae, the following formulae can be employed to identify negatives photographed in fluorescent light.

$$X_1 = \sum_{i=1} a_i x_i + a_0 \tag{35}$$

$$X_2 = \sum_{i=1} a_i' x_i + a_0' \tag{36}$$

wherein $X_1$–$X_3$ are $LATD_B$, $LATD_G$ and $LATD_R$, $X_4$–$X_6$ represent the respective average values of the blue, green and red densities of points determined to have flesh color under fluorescent light, $X_7$–$X_9$ represent the blue, green and red densities of the maximum density point, $X_{10}$ represents the area ratio of the gray portion in the negative and $X_{11}=C_p=\frac{1}{2}$ (Dmin+Dmax)−LATD.

When $X_1 \geq \delta_1$ and $X_2 \geq \delta_2$, the negative is determined to have been photographed in fluorescent light, $\delta_1$ and $\delta_2$ being constants to be experimentally determined.

The negatives determined to have been photographed in fluorescent light are printed at high correction mode.

FIG. 8 shows a flow chart for identifying a negative photographed in fluorescent light in the fluorescent light identifying subsection 12e. As shown in FIG. 8, a negative is sequentially examined as to whether it satisfies the above formulae (29') to (34') (decisions $L_{20}$ to $L_{25}$). If the answer in the last decision or the decision $L_{25}$ is "YES", i.e., when the answers in the decisions $L_{20}$ to $L_{25}$ are all "YES", the negative is determined to have been photographed in fluorescent light and the color correction is conducted at high correction mode. If any answer is "NO", the negative is determined not to belong to the fluorescent light group and the sequence is interrupted. The negative is then delivered to the next subsection of the negative identifying section 12, i.e., to the aged negative identifying subsection 12f.

An experiment was conducted using 16,400 negatives including therein 119 negatives photographed in fluorescent light. The result was such that 73 negatives of 119 negatives which were known to have been photographed in fluorescent light were properly classified into the fluorescent light group and six negatives which not photographed in fluorescent light were classified into the fluorescent group by mistake. The misclassified negatives included some having normal color balance and some having a large area ratio of yellow-green portion.

When the negatives determined to have been photographed in fluorescent light were printed at high correction mode, color prints having proper color balance were obtained.

When color-correcting using the color keys is carried out, it is required to use different color keys to change the amount of correction depending on the degree of the color defect. The degree of the color defect can be conveniently determined through said $L_p$.

The following is an example of the relation between values of $L_p$ and the color keys to be used:
(1) $0.25 \leq L_p < 0.30$ color key $C_1$ (small correction)
(2) $0.30 \leq L_p \leq 0.40$ color key $C_2$ (medium correction)
(3) $L_p > 0.40$ color key $C_3$ (large correction)

Similarly, it is also efficient to change the amount of correction in at least two steps depending on the degree of the color defect, when conducting the correction at high correction mode.

For example, when $0.25 \leq L_p < 0.30$, smaller amount of correction is conducted, and when $L_p \geq 0.30$, larger amount of correction is conducted.

(VI) Aged negatives

Figure 9:
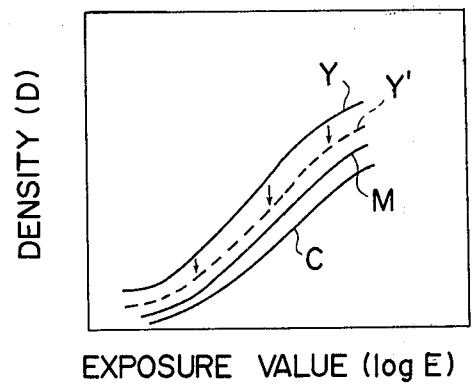
FIG. 9 is a graph showing the characteristic curves of an aged photosensitive material.

When photosensitive material is aged, the sensitivity of at least one layer of the material is increased or reduced, and the characteristic curve thereof shifts laterally, depending on the period of storage and the storage condition. Sometimes, even the type of curve or the mask density may change. FIG. 9 illustrates an example of "aging". In the example of FIG. 9, the sensitivity of the blue sensitive layer is reduced and the characteristic curve has moved from the original position shown by a solid line to the position shown by a dotted line.

In aged negatives, the amount of a particular color, i.e., yellow in the example of FIG. 9, is reduced. Thus, the resulting prints, when printed by the LATD system, become bluish.

For the reasons described above, under-exposed negatives are not classified into the aged negative group, even if the negative is aged. Thus, $$LATD_W \geq u_1 \tag{37}$$

Hue based on LATD of aged negatives is generally distributed within a limited range in the two-dimensional chromatically coordinate system wherein the ordinate represents (G−B) and the abscissa (R−G). Accordingly, $L_p$ and $L\theta$ of aged negatives will satisfy the following formula, $L_p$ and $L\theta$ representing hue based on LATD.

$$L_p \geq L_{p6} \cap L\theta_9 < L\theta < L\theta_{10} \tag{38}$$

wherein $L_{p6}$, $L\theta_9$ and $L\theta_{10}$ are standard values to be experimentally determined.

Since, conditions and degrees of aging of aged negatives are distributed over a substantially wide range, the description here will be made with respect to aged negatives in which the blue sensitive layer has been changed. The degree of aging is classified as short or long.

Figure 10:
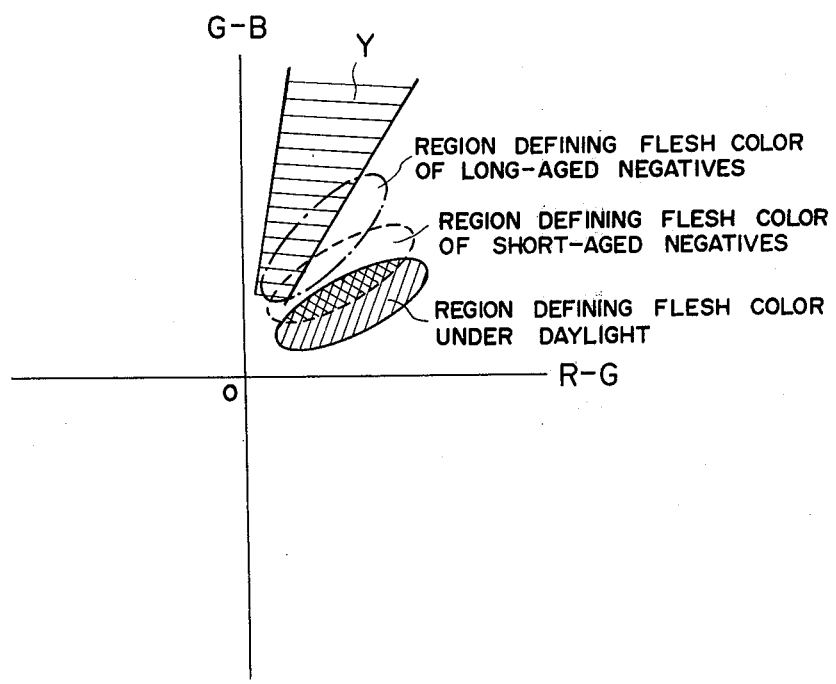
FIG. 10 is a two-dimensional chromaticity coordinate system showing the regions of flesh color photographed under various conditions.

FIG. 10 shows regions defining flesh color under daylight, flesh color of long-aged negatives, flesh color of relatively short-aged negatives and yellow, respectively. As shown in FIG. 10, the region of flesh color of the long-aged negatives overlaps more with the region of yellow than with the region of flesh color under daylight. Accordingly, long-aged negatives will satisfy the following formula:

$$nSF = 0 \cap nY \geq A_{13} \tag{39}$$

wherein nSF and nY represent the number of points determined to have flesh color under daylight and the number of points determined to be yellow, respectively, and $A_{13}$ is a standard value to be experimentally determined.

Relatively short-aged negatives may not satisfy the formula (39). However, even in such short-aged negatives, the hue of flesh color is shifted as indicated by a dotted line in FIG. 10. Thus, by inspecting the average hue of the points determined to have flesh color under daylight, it is possible to know whether the negative is aged or not, through the inclination of the average hue. Thus, the following formula will be satisfied:

$$SFY \geq \beta_1 \tag{40}$$

wherein SFY represents the density difference G−B of the average hue of the points determined to have flesh color under daylight in the two-dimensional chromaticity coordinate system.

Further, with such relatively short aging, a negative is determined to be aged, when the hue of the points determined to have flesh color under daylight falls within the yellow region with a predetermined frequency, or when the following formula is satisfied:

$$nY \geq A_{14} \tag{41}$$

Further, a negative which is not similar to one susceptible to green failure (such as one whose principal subject matter is a human figure taken outdoors) can be classified into the aged negative group, even if it does not satisfy the formula (41). Negatives similar to one susceptible to green failure will satisfy the following formula:

$$100 \times nYg/(nG+nYG) \leq A_{15} \cap nG \geq A_{16} \quad (42)$$

The above formulae (37)–(42) for discriminating aged color negatives can be grouped together as follows.

$$LATD_W \geq u_1 \quad (37)$$

$$L\theta_9 < L\theta < L\theta_{10} \cap Lp \geq Lp_6 \quad (38)$$

$$nSF = 0 \cap nY \geq A_{13} \quad (39)$$

$$SFY \geq \beta_1 \quad (40)$$

$$nY \geq A_{14} \quad (41)$$

$$100 \times nYG/(nG+nYG) \leq A_{15} \cap nG \geq A_{16} \quad (42)$$

The above standard values were determined experimentally by inspecting 25,000 negatives photographed over the whole year to obtain the following formulae:

$$LATD_W \geq 0.3 \quad (37')$$

$$50° < L\theta < 160° \cap Lp \geq 0.20 \quad (38')$$

$$nSF = 0 \cap nY \geq 2 \quad (39')$$

$$SFY \leq 0.25 \quad (40')$$

$$nY \geq 1 \quad (41')$$

$$100 \times nYG/(nG+nYG) < 50 \cap nG \geq 150 \quad (42')$$

FIG. 11 shows a flow chart for identifying aged negatives in the aged negative identifying subsection 12f. As shown in FIG. 11, a negative is first examined as to whether it satisfies the formula (37') (decision $L_{26}$). If the answer in the decision $L_{26}$ is "YES", the negative is then examined as to whether it satisfies the formula (38') (decision $L_{27}$). If the answer in the decision $L_{27}$ is "YES", the negative is examined as to whether it satisfies the formula (39') (decision $L_{28}$). If the answer in the decision $L_{28}$ is "NO", the negative is examined as to whether it satisfies the formula (40') (decision $L_{29}$). If the answer in the decision $L_{29}$ is "YES", the negative is examined as to whether it satisfies the formula (41') (decision $L_{30}$). If the answer in the decision $L_{30}$ is "NO", the negative is examined as to whether it satisfies the formula (42') (decision $L_{31}$).

If the answer in the decision $L_{28}$ or the decision $L_{30}$ is "YES", or if the answer in the decision $L_{31}$ is "NO", the negative is determined to belong to the aged negative group. Otherwise, the negative is delivered to the next subsection of the negative identifying section 12, e.g., to the high color temperature identifying subsection 12g.

When color-correcting using the color keys is carried out, it is preferable to use different color keys to change the amount of correction in accordance with the degree of aging. The degree of aging can be conveniently determined through said $Lp$.

The following is an example of the relation between values of $Lp$ and the color keys to be used:
(i) $0.2 \leq Lp \leq 0.30$ color key $C_1$ (small correction)
(ii) $0.30 \leq Lp \leq 0.40$ color key $C_2$ (medium correction)
(iii) $Lp > 0.40$ color key $C_3$ (large correction)

Similarly, it is also efficient to change the amount of correction in at least two steps depending on the degree of aging, when conducting the correction by high correction mode.

For example, when $0.2 \leq Lp \leq 0.30$, smaller amount of correction is conducted, and when $Lp \geq 0.30$, larger amount of correction is conducted.

If desired, the correction by high correction mode and the correction using the color keys may be combined. For example,
(i) $0.2 \leq Lp \leq 0.30$ smaller amount of correction by high correction mode
(ii) $0.30 \leq Lp \leq 0.40$ color key $C_2$
(iii) $Lp > 0.40$ color key $C_3$ (VII) Negatives having high color temperature Negatives having high color temperature produce bluish prints when printed by LATD system.

As described above, under-exposed negatives are not classified into the high color temperature group. Thus, $$LATD_W \geq u_1 \quad (43)$$

In a negative having high color temperature, grayish or bluish colors occupy a large portion of the image. Accordingly, negatives having high color temperature can be distinguished from others by the area ratio of gray.

Thus, negatives having high color temperature will satisfy the following formula:

$$nGray \geq A_{17} \quad (44)$$

wherein $A_{17}$ is a standard value experimentally determined.

Further, hue based on LATD of negatives having high color temperature with a large portion occupied by grayish colors is generally distributed within a circle having a diameter of $Lp_7$ in the two-dimensional chromaticity coordinate system, $Lp_7$ being a standard value to be determined experimentally. Thus, the following formula will be satisfied.

$$Lp \leq Lp_7 \quad (45)$$

In order to discriminate between aged negatives and negatives susceptible to color failure, the following formula can be used:

$$nR + nG + nY + nYG \leq A_{18} \quad (46)$$

wherein $nYG$ represents the number of yellow-green points and $A_{18}$ is a standard value to be experimentally determined.

Bluish negatives also have high color temperature. Such negatives inherently have many blue points. Thus, bluish negatives having high color temperature will satisfy the following formula:

$$nB \geq A_{19} \quad (47)$$

wherein $A_{19}$ is a standard value to be experimentally determined.

Further, hue based on LATD of bluish negatives having high color temperature is generally distributed within a circle having a diameter of $Lp_8$ in the two-dimensional chromaticity coordinate system, $Lp_8$ being a standard value to be determined experimentally. Thus, the following formula will be satisfied.

$$Lp \leq Lp_8 \quad (48)$$

Aged negatives and negatives susceptible to color failure should be excluded even if they have high color temperature. Hue based on LATD of such negatives is generally distributed within the range defined by the following formula:

$$L\theta_{11} \leq L\theta \leq L\theta_{12} \qquad (49)$$

wherein $L\theta_{11}$ and $L\theta_{12}$ are standard values to be determined experimentally.

Negatives which satisfy all of the above formulae (43) to (46) are determined to be grayish negatives having high color temperature, while negatives which satisfy the formulae (43), (47) and (48), and do not satisfy the formulae (44) and (49) are determined to be bluish negatives having high color temperature.

The above formulae (43)–(49) for discriminating grayish negatives or bluish negatives can be grouped as follows.

(a) With respect to grayish negatives:

$$LATD_W \geq u_1 \qquad (43)$$

$$nGray \geq A_{17} \qquad (44)$$

$$L\rho \leq L\rho_7 \qquad (45)$$

$$nR + nG + nY + nYG \leq A_{18} \qquad (46)$$

(b) With respect to bluish negatives:

$$LATD_W \geq u_1 \qquad (43)$$

$$nGray < A_{17} \qquad (44)$$

$$nB \geq A_{19} \qquad (47)$$

$$L\rho \leq L\rho_8 \qquad (48)$$

$$L\theta_{11} \leq L\theta \leq L\theta_{12} \qquad (49)$$

The above standard values were experimentally determined by inspecting 25,000 negatives photographed over the whole year to give the following formulae:

(a) With respect to grayish negatives:

$$LATD_W \geq 0.3 \qquad (43')$$

$$nGray \geq 60 \qquad (44')$$

$$L\rho \leq 0.15 \qquad (45')$$

$$nR + nG + nY + nYG \leq 10 \qquad (46')$$

(b) With respect to bluish negatives:

$$LATD_W \geq 0.3 \qquad (43')$$

$$nGray < 60 \qquad (44')$$

$$nB \geq 5 \qquad (47')$$

$$L\rho \leq 0.2 \qquad (48')$$

$$0° \leq L\theta \leq 100° \qquad (49')$$

Figure 12:
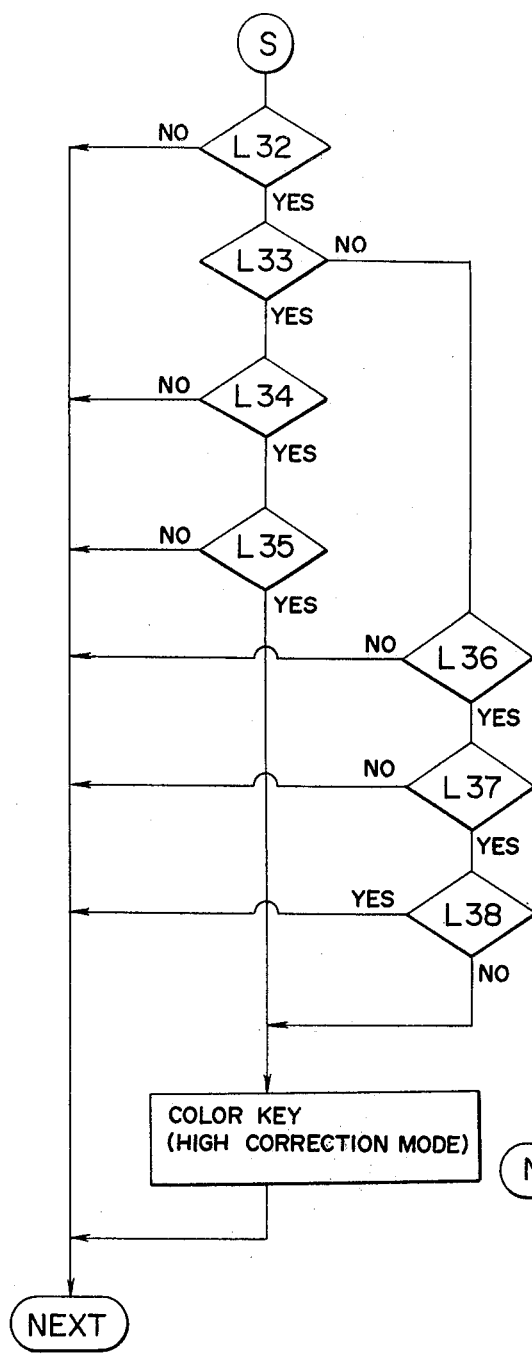

FIG. 12 shows a flow chart for identifying negatives having high color temperature in the high color temperature identifying subsection 12g. As shown in FIG. 12, a negative is examined as to whether it satisfies the formula (43') (decision $L_{32}$). If the answer in the decision $L_{32}$ is "YES", the negative is then examined as to whether it satisfies the formula (44') (decision $L_{33}$). If the answer in the decision $L_{33}$ is "YES", the negative is subsequently examined as to whether it satisfies the formula (45') (decision $L_{34}$). If the answer in the decision $L_{34}$ is "YES", the negative is examined as to whether it satisfies the formula (46') (decision $L_{35}$). If the answer in the decision $L_{35}$ is "YES", the negative is determined to have high color temperature.

If the answer in the decision $L_{33}$ is "NO", then the negative is examined as to whether it satisfies the formula (47') (decision $L_{36}$). If the answer in the decision $L_{36}$ is "YES", the negative is examined as to whether it satisfies the formula (48') (decision $L_{37}$). If the answer in the decision $L_{37}$ is "YES", the negative is examined as to whether it satisfies the formula (49') (decision $L_{38}$). If the answer in the $L_{38}$ is "NO", the negative is determined to have high color temperature.

If the answer in the decisions $L_{32}$, $L_{34}$–$L_{37}$ is "NO", or if the answer in the decision $L_{38}$ is "YES", the negative is delivered to the next subsection, i.e., the low color temperature identifying subsection 12h.

(IIX) Negatives having low color temperature

Negatives having low color temperature produce reddish prints when printed by the conventional LATD system. Such negatives having low color temperature will satisfy the following formulae:

$$LATD_W \geq u_1 \qquad (50)$$

$$L\rho \geq L\rho_9 \cap L\theta_{13} \leq L\theta \leq L\theta_{14} \qquad (51)$$

$$nSF \geq A_{20} \qquad (52)$$

$$SFY \geq \beta_2 \cap SFX \geq \beta_3 \qquad (53)$$

$$nY \leq A_{21} \qquad (54)$$

wherein $u_1$, $L\rho_9$, $L\theta_{13}$, $L\theta_{14}$, $A_{20}$, $\beta_2$, $\beta_3$ and $A_{21}$ are standard values to be experimentally determined and the SFX represents the average (R−G) density of the points determined to have flesh color under the daylight. The standard values were determined experimentally to give the following formulae:

$$LATD_W \geq 0.3 \qquad (50')$$

$$L\rho \geq 0.15 \cap 40° \leq L\theta \leq 120° \qquad (51')$$

$$nSF \geq 5 \qquad (52')$$

$$SFY \geq 0.23 \cap SFX \geq 0.10 \qquad (53')$$

$$nY < 50 \qquad (54')$$

Figure 13:
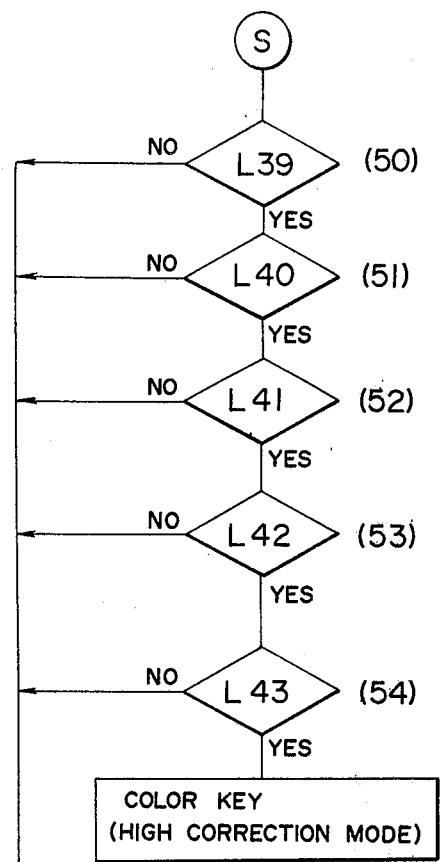

FIG. 13 shows a flow chart for identifying negatives having low color temperature in the low color temperature identifying subsection 12h. As shown in FIG. 13, a negative is sequentially examined as to whether it satisfies the above formulae (50') to (54') (decisions $L_{39}$ to $L_{43}$). If the answer in the last decision is "YES", i.e., if the answers in the decisions $L_{39}$ to $L_{43}$ are all "YES", the negative is determined to have low color temperature and is printed at lowered correction mode or by using the color key combination of "1 0 A".

INDUSTRIAL APPLICABILITY

In the above mentioned color correction method for color negatives in accordance with this invention, as the characteristics used for the color correction are selected the large area transmission density (LATD) and the hue based on LATD as well as the area ratios of particular colors, the average hue of the particular colors, the hue of the maximum density point, etc., and therefore classification of the color negatives can be properly performed, and each color negative is then color corrected in accordance with this classification.

Studies conducted by the inventors showed that about 58.3% of negatives on the market have color faults (color failure, light source color, improper exposure, etc.), and that when the negatives were printed by the conventional LATD system, about 3-5% of the resulting color prints were unsatisfactory. Then, when the negatives were printed in accordance with the method of this invention, a percentage of the unsatisfactory color prints was reduced to half.

I claim:

1. A color correction method for a color printing system, comprising the steps of:
    measuring various characteristics of color negatives to be printed;
    calculating, based on said measured various characteristics, further characteristics of said color negatives to be provided;
    classifying said color negatives into groups of negatives including at least a group of negatives susceptible to color failure, a group of negatives photographed in fluorescent light, a group of negatives photographed under tungsten light, a group of over-exposed negatives and a group of under-exposed negatives on the basis of said measured various characteristics and said calculated further characteristics; and
    conducting color correction in accordance with the group to which each said negative to be printed belongs;
    wherein said various measured characteristics include the large area transmission density, the red, green and blue large area transmission densities, and the red, green and blue densities of the maximum density point, and wherein said calculated further characteristics include the area ratios of particular colors, the average hue of the points determined to have flesh color under daylight, the average hue of the points determined to have flesh color under fluorescent light, and the average hue of the points determined to have flesh color under tungsten light; and
    wherein the manner of said color correction is predetermined with respect to the groups of negatives.

2. A method as defined in claim 1 wherein said particular colors include blue, green, red, yellow, gray and flesh color under daylight, tungsten light and fluorescent light.

3. A method as defined in claim 1 wherein said color correction is conducted by using a combination of color keys predetermined with respect to the groups of negatives.

4. A method as defined in claim 1 wherein said color correction is conducted selectively at high correction mode or lowered correction mode, said selected correction mode being predetermined with respect to the group of negatives into which each said color negative is classified.

5. A method as defined in claim 1 wherein said color correction is conducted at high correction mode, lowered correction mode or a combination of color keys.

6. A method as defined in claim 1 wherein the groups of negatives further include groups of negatives having high color temperature, negatives having low color temperature, and aged negatives.

7. A method as defined in claim 6 wherein each said negative is preferentially classified into one of said groups in accordance with a predetermined preferential order when the negative can be classified into a plurality of the groups.

8. A color correction method for a color printing system, comprising the steps of:
    measuring various characteristics of color negatives to be printed;
    calculating, based on said measured various characteristics, further characteristics of said color negatives to be printed;
    classifying each said color negative into groups of negatives including at least a group of under-exposed negatives, a group of over-exposed negatives, and a group of negatives susceptible to color failure on the basis of said measured various characteristics and said calculated further characteristics; and
    conducting color correction in accordance with the group to which said negative to be printed belongs;
    wherein said various measured characteristics include the large area transmission density, the red, green and blue large area transmission densities, and the red, green and blue densities of the maximum density point, and wherein said calculated further characteristics include the area ratios of particular colors, the average hue of the points determined to have flesh color under daylight, the average hue of the points determined to have flesh color under fluorescent light, and the average hue of the points determined to have flesh color under tungsten light; and
    wherein the manner of said color correction is predetermined with respect to the groups of negatives.

9. A method as defined in claim 8, wherein said calculated further characteristics include the hue of particular colors and the hue of a maximum density point.

10. A method as defined in claim 4, wherein the degree of the color defect of the classified color negative to be printed is classified into a plurality of levels in advance, the correction mode being divided into a plurality of steps corresponding to the levels of the degree of the color defect, and the color being corrected according to the degree of the color defect.

* * * * *